July 16, 1957 W. C. HASSELHORN 2,799,808
POWER-CROSS PROTECTOR ASSEMBLY
Filed June 10, 1954
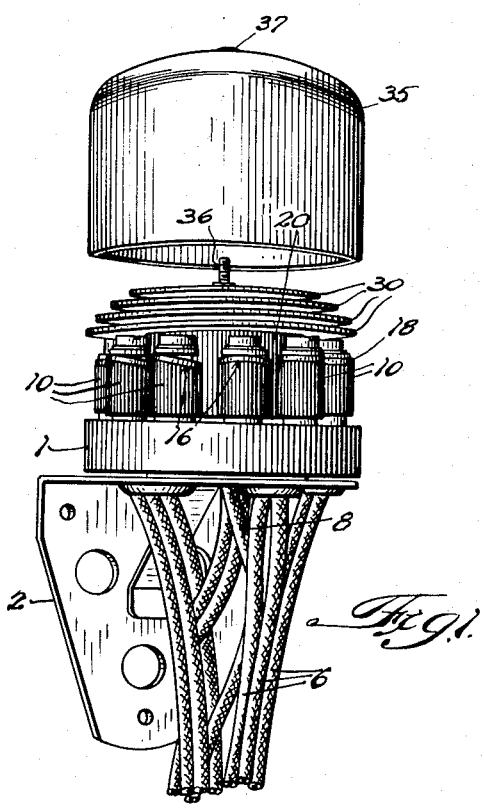
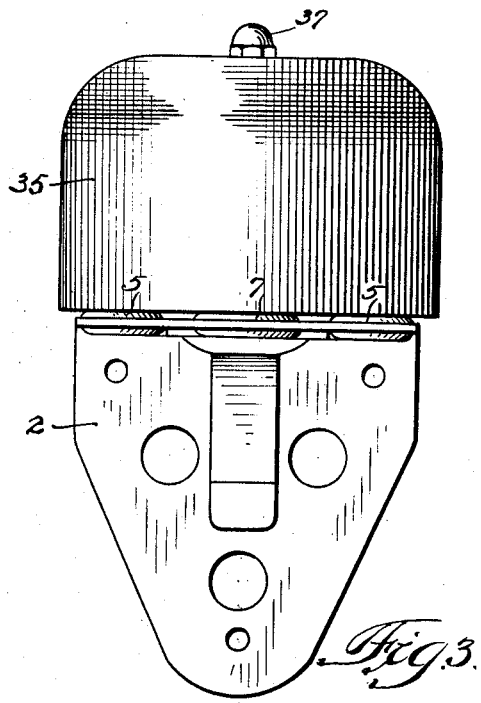
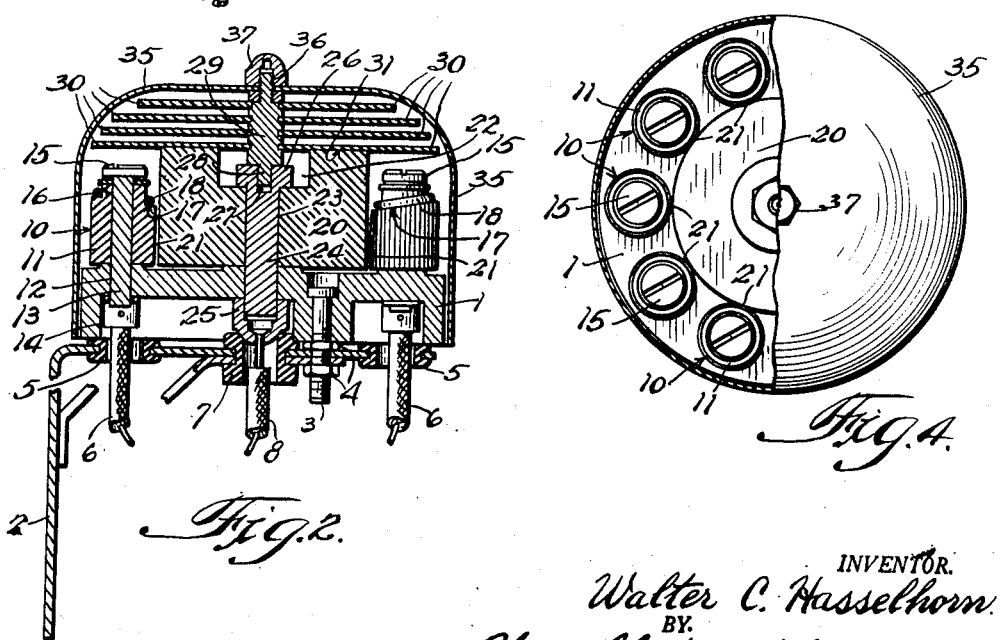
INVENTOR.
Walter C. Hasselhorn

United States Patent Office 2,799,808
Patented July 16, 1957

2,799,808
POWER-CROSS PROTECTOR ASSEMBLY

Walter C. Hasselhorn, Evanston, Ill., assignor to Cook Electric Company, Chicago, Ill., a corporation of Illinois Application June 10, 1954, Serial No. 435,737

10 Claims. (Cl. 317—69)

This invention relates to arresters, and more particularly, to heavy duty arresters in telephone and similar communication circuits.

It has been found expedient in many instances to carry telephone circuits on the same poles carrying power circuits of considerably higher voltage and usually at a location lower than the power lines, but at such close proximity that there are occasions when contact between the two occurs. It is essential to remove the power voltage from the telephone line as promptly as possible before any damage is done to a subscriber's premises, or person, or to the telephone company's personnel.

In copending application Serial No. 309,483, filed September 13, 1952, now Patent No. 2,756,367, I have disclosed a high capacity arrester providing a path to ground of sufficiently low impedance so that the fault current flowing through the arrester will quickly rise to a sufficiently high value to trip the circuit breakers in the power line. The arrester will carry the fault current until the line is cleared by the circuit breaker in the power line. The arrester is so designed that the fault current will be carried in most cases without destroying the arrester. The structure is also intended to provide desirable lighting protection when spaced properly along the exposed line. I have found, however, that there is a tendency for the terminal posts of the arrester to break down, particularly if made of carbon. Carbon tends to disintegrate under sustained high temperatures which may exist if the fault current is carried until the line is cleared by the circuit breakers in the power line.

It is an object of the invention, therefore, to provide a high capacity arrester having heat conducting and dissipating means as a part of its improved design whereby the heat generated during arcing at the gaps will be readily conducted away from the terminal posts and the grounded block and the temperature thereby held within a range tending to prevent disintegration of the carbon terminals and the grounded block.

To this end the grounded block may have a number of terminal posts, to which line wires are connected, arranged in concentric relation or in any suitable way with the grounded block to form a plurality of arcing or discharge gaps therebetween. A series of heat conducting plates are arranged efficiently to transfer the heat generated at these discharge gaps away from the terminal posts and grounded block, the conducting plates preferably overlying the gaps and in direct heat conducting relation with the grounded block. In a preferred form, one of the series of heat conducting plates is in surface contact with a face of the grounded block and the other plates are spaced therefrom and from each other above the first plate. The parts are few and simple, but effective. A cover forms an enclosure for these parts which are conveniently arranged upon and carried by a base. The location of the heat conducting plates within this cover efficiently dissipates the heat in the upper part of the enclosure through the cover. The action tends to keep the carbon of the terminals and grounded block at a temperature low enough during arcing to prevent unnecessary destruction of the carbon through pitting, disintegration, or otherwise.

Other objects and advantages of the invention will be apparent from the following detail description when taken in connection with the accompanying drawing which forms a part hereof.

In the drawing:

Figure 1 is a perspective view of an arrester embodying the present invention and having its cover slightly raised;

Fig. 2 is a vertical cross section of this arrester with the cover in place;

Fig. 3 is a front elevation of the arrester; and

Fig. 4 is a top view with a portion of the cover broken away.

Referring to the drawings, base 1 may be of insulation material such as porcelain and may be carried upon a bracket 2 of any suitable shape. Base 1 may have a bolt 3 passing therethrough and into the horizontal leg or platform of bracket 2. Suitable lock nuts 4 secure bolt 3 firmly in position and hold base 1 tightly upon this horizontal leg or platform of bracket 2 and at the same time keep base 1 slightly spaced from the bracket so as to accommodate insulation grommets 5 through which service wires 6 pass for attachment to connectors 14, as will be later described, and, also to accommodate an insulation grommet 7 through which grounded wire 8 passes.

A plurality of carbon terminal posts or electrodes 10 are mounted upon porcelain base 1. Each electrode 10 comprises a carbon sleeve 11 carried by a pin 12 which passes at its lower end 13 through base 1 and receives connector 14 to which line wire 7 is connected. Head 15 of each pin 12 holds the latter firmly in place as the pin is drawn down tightly by the connector 14. Each carbon sleeve 11 is reduced in cross section at the upper end 16 and is provided with an inwardly sloping face 17 upon which rests a ring 18 of low melting point. Electrodes 10 are arranged concentrically about a grounded carbon block 20.

Carbon block 20 is preferably of a diameter that will provide arc gaps 21 of a predetermined distance between electrodes 10 and itself. The center portion of block 20 may be cut away as at 22 and provided with a hole 23 through which a pin 24 or equivalent mounting member passes to fasten block 20 to base 1. The lower end of pin 24 securely receives an insulation cap 25 through which the bare end of ground wire 8 passes for attachment to this lower end of pin 24.

The upper end of pin 24 is provided with a head 26 which has a center opening 27 and into which a reduced lower end 28 of a center post 29 is fitted.

Post 29 is peripherally grooved at different levels. In each peripheral groove is seated a heat dissipating plate 30, there being four shown in the embodiment of the invention disclosed herein although any number may be used that are capable of accomplishing the purpose intended. The arrangement holds the plates 30 spaced from each other but in heat conducting relation with post 29 at their centers as well as in heat conducting relation with pin 24. Cutaway portion 22 leaves a flat peripheral face 31 at the upper part of block 20. The lowermost plate 30 is preferably arranged to be seated upon this flat face 31 in order to have a substantial contact with block 20 and, therefore, a greater heat conducting relation therewith. The close proximity of the upper plates 30 to each other and to this lowermost plate causes all of said plates to pick up the heat of block 20 quickly and to dissipate the same outwardly to the peripheries, the uppermost plate also dissipating the heat upwardly or outwardly from itself.

A cover 35 encloses the parts upon base 1 to protect the same from the elements and to assist in dissipating heat generated at the time of arcing at gaps 21. This cover 35 may be held in any suitable way to enclose the parts, but, as illustrated, it may be carried upon post 29 which has its upper end 36 threaded to pass through an opening in the cover and to receive a nut 37, which, when screwed down, holds the cover in position and keeps it in a predetermined spaced relation from the plate peripheries. Both the plates and the cover may be made of good heat conducting material such as metal or the like. As pointed out, the lower plate lies flatly upon face 31, which is of relatively substantial area of the total exposed area of the top of grounded block 20. Consequently, the heat is conducted rapidly away from block 20 to the lower of the plates and then outwardly at its periphery where the heat is dissipated through the cover. A portion of the heat will be picked up by the succeeding plates and will likewise be dissipated outwardly at their peripheries through the cover.

The arrangement provides a high capacity structure capable of removing power voltage from a telephone line before any damage may be done to a subscriber's premises or to the telephone company's personnel. As previously stated, power voltage is imposed upon telephone circuits at times as the result of telephone companies finding it expedient to place their circuits on joint poles carrying power circuits, but lower than the power circuits and, of course, in such close proximity that there are occasions when contact between the two occurs. It will be obvious that each electrode 10 comprises an arrester providing a path of low impedance to ground so that the power voltage will quickly rise to a sufficiently high value to trip the circuit breakers on the power line. If need be, the low melting point ring 18 may fuse and flow between the carbon sleeve 11 and the grounded carbon block 20, and, if the fault current is sufficiently high, the temperature may vaporize the material 18 before the arcing ceases. If ring 18 fuses, it is capable of being easily replaced.

The temperatures produced during arcing or discharging of fault currents will at times be quite high. It is desirable to dissipate the heat as rapidly as possible. Sustained arcing will, over a period of time, tend to disintegrate the carbon sleeves 11 and also grounded block 20. This can be effectively overcome to a large degree by dissipating the heat and not allowing it to build up. It is found that heat conducting plates 30 quite effectively transfer the heat from block 20 and from electrodes 10 to the region of the cover 35 from which it is readily dissipated to the exterior. The large surface contact of the lowermost plate 30 with block 20 allows rapid conduction of the heat from this block. Even the mounting parts for these plates 30 tend to conduct heat from block 20 to the plates at their center.

While various designs of arresters have heretofore been proposed, the structure disclosed herein is simple, relatively inexpensive to make and has been found exceedingly efficient in actual service.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. An arrester comprising a base of insulation, a grounded post and a plurality of spaced terminal posts to provide a plurality of arcing gaps with said grounded post, means securing said posts to said base, said means providing line connections for said terminal posts and a grounded connection for said grounded post all at the bottom of said base, a plurality of spaced heat dissipating plates at the top of said grounded post, means to connect said heat dissipating plates to said grounded post, said means carrying the lower heat dissipating plate in substantial surface contact with said grounded post and projecting to be directly over said arcing gaps, and a cover enclosing all of said posts upon said base and receiving the heat of said plates in close peripheral proximity for dissipation to the exterior of the cover.

2. An arrester comprising a base of insulation, a grounded post and a plurality of terminal posts arranged about said base to provide predetermined arcing gaps between said grounded post and said terminal posts, terminal line connections and a grounded connection for said terminal and grounded posts, respectively, common means for securing each of said posts and its corresponding connection to said base, and a plurality of plates to conduct the heat away from said posts during arcing at said gaps, one of said plates being in surface contact with one of said posts and disposed above and over said arcing gaps.

3. An arrester comprising a base of insulation, a grounded post and a plurality of terminal posts arranged about said base to provide predetermined arcing gaps between said grounded post and said terminal posts, terminal line connections and a grounded connection for said terminal and grounded posts, respectively, common means for securing each of said posts and its corresponding connection to said base, a cover for enclosing said posts upon said base, and means for conducting the heat away from said posts during arcing at said gaps and for dissipating the heat through said cover, said means comprising a series of superimposed plates mounted above said grounded post, the lowest plate being in substantial surface contact with said grounded post and extending beyond said grounded post to overlie said arcing gaps.

4. An arrester comprising a base of insulation, a grounded post and a plurality of terminal posts arranged about said base to provide predetermined arcing gaps between said grounded post and said terminal posts, terminal line connections and a grounded connection for said terminal and grounded posts, respectively, common means for securing each of said posts and its corresponding connection to said base, a cover for enclosing said posts upon said base, and means for conducting the heat away from said posts during arcing at said gaps and for dissipating the heat through said cover, said means comprising a series of superimposed plates mounted above said grounded post, the bottom plate being in surface contact with said grounded post, the remaining plates being above and spaced from said bottom plate and from each other.

5. An arrester comprising a base of insulation, a grounded post and a plurality of terminal posts arranged about said base to provide predetermined arcing gaps between said grounded post and said terminal posts, terminal line connections and a grounded connection for said terminal and grounded posts, respectively, common means for securing each of said posts and its corresponding connection to said base, a cover for enclosing said posts upon said base, and means for conducting the heat away from said posts during arcing at said gaps and for dissipating the heat through said cover, said means comprising a series of superimposed plates mounted above said grounded post, the bottom plate being in surface contact with said grounded post, the remaining plates being above and spaced from said bottom plate and from each other, all of said plates being disposed in the upper part of said cover and in close peripheral proximity thereto and overlying said arcing gaps.

6. An arrester comprising a base of insulation, a carbon block disposed upon and secured to said base, a ground connection for said carbon block, a plurality of carbon terminal posts also disposed upon and secured to said base to provide a plurality of predetermined arcing gaps between said carbon terminal posts and said grounded carbon block, conductor mounting pins for each carbon terminal post, said mounting pins extending through said base, line connections adapted to be secured to said pins, and a plurality of plates disposed upon said grounded carbon block above and over said arcing gaps to conduct the heat away from all of said posts during arcing of said gaps, the lowermost plate being in substantial surface contact with said grounded carbon block.

7. An arrester comprising a base of insulation, a carbon block disposed upon and secured to said base, a ground connection for said carbon block, a plurality of carbon terminal posts also disposed upon and secured to said base to provide a plurality of predetermined arcing gaps between said carbon terminal posts and said grounded carbon block, conductor mounting pins for each carbon terminal post, said mounting pins extending through said base, a mounting pin also extending through said base to fasten said carbon block thereto and comprising a part of said ground connection for said carbon block, a line connection for each of said carbon terminal posts, and means carried by said carbon block to conduct heat generated at said arcing gaps away from said carbon terminal posts and said carbon block, said means comprising a series of plates, the lowest plate being carried directly in surface contact with said carbon block and extending with the other plates over said arcing gaps.

8. An arrester comprising a base of insulation, a carbon block disposed upon said base, a ground connection for said carbon block, a plurality of carbon terminal posts disposed concentrically on said base about said carbon block to provide a plurality of predetermined arcing gaps between said carbon terminal posts and said carbon block, a mounting member extending through said base to fasten said carbon block thereto and comprising a part of the ground connection for said carbon block, a plurality of spaced apart heat conducting plates to conduct heat generated at said arcing gaps away from said carbon block and said carbon terminal posts, and means to mount said plates upon said carbon block, the lowest plate being in substantial surface contact with said carbon block and extending with the other plates over said arcing gaps.

9. An arrester comprising a base of insulation, a carbon block disposed upon said base, a ground connection for said carbon block, a plurality of carbon terminal posts disposed concentrically on said base about said carbon block to provide a plurality of predetermined arcing gaps between said carbon terminal posts and said carbon block, a mounting member extending through said base to fasten said carbon block thereto and comprising a part of the ground connection for said carbon block, a plurality of spaced apart heat conducting plates to conduct heat generated at said arcing gaps away from said carbon block and said carbon terminal posts, means to mount said plates upon said carbon block, the lowest plate being in substantial surface contact with said carbon block and extending with the other plates over said arcing gaps, and a cover for enclosing said carbon block, terminal posts and plates upon said base, said plates being in close peripheral proximity to said cover.

10. An arrester comprising a base of insulation, a carbon block disposed upon said base, a ground connection for said carbon block, a plurality of carbon terminal posts disposed concentrically on said base about said carbon block to provide a plurality of predetermined arcing gaps between said carbon terminal posts and said carbon block, a mounting member extending through said base to fasten said carbon block thereto and comprising a part of the ground connection for said carbon block, a cover for enclosing said carbon block and said carbon posts upon said base, a plurality of spaced apart heat conducting plates to conduct heat generated at said arcing gaps away from said carbon block, and means to mount said plates upon said carbon block and in close peripheral proximity to said cover, the lowermost plate being in surface contact with said carbon block.

References Cited in the file of this patent

UNITED STATES PATENTS

| 971,935 | Simon | Oct. 4, 1910 |
| 1,292,661 | Stevens | Jan. 28, 1919 |
| 1,322,610 | Pfanstiehl | Nov. 25, 1919 |
| 1,399,005 | Crouse | Dec. 6, 1921 |
| 2,644,115 | Sands | June 30, 1953 |

FOREIGN PATENTS

| 24,471 | Great Britain | Nov. 7, 1896 |
| 771,328 | France | July 23, 1934 |
| 648,736 | Great Britain | Jan. 10, 1951 |